United States Patent [19]
Simonet et al.

[11] 3,796,022
[45] Mar. 12, 1974

[54] METHOD OF AND INSTALLATION FOR THE FRACTIONATION OF A GASEOUS MIXTURE BY ADSORPTION

[75] Inventors: Guy Simonet; Claude Pivard, both of Paris, France

[73] Assignee: L'Air Liquide, Societe Anonyme Pour L'Etude Et L'Exploitation Des Procedes George Claude, Paris, France

[22] Filed: Nov. 20, 1972

[21] Appl. No.: 307,854

[30] Foreign Application Priority Data
Nov. 30, 1971  France .......................... 71.42793

[52] U.S. Cl. ............................ 55/25, 55/33, 55/68, 55/179, 55/389
[51] Int. Cl. ............................................. B01d 53/04
[58] Field of Search .............. 55/25, 30, 31, 32, 68, 55/74, 75, 62, 179, 389

[56] References Cited
UNITED STATES PATENTS

| | | | |
|---|---|---|---|
| 3,242,645 | 3/1966 | Montgareuil et al. | 55/58 |
| 3,702,525 | 11/1972 | Simonet et al. | 55/62 |
| 3,719,025 | 3/1973 | Heinze et al. | 55/58 |
| 3,720,042 | 3/1973 | Simonet | 55/25 |

*Primary Examiner*—Charles N. Hart
*Attorney, Agent, or Firm*—Young & Thompson

[57] ABSTRACT

A method of fractionation of a gaseous mixture by adsorption, utilizing at least one adsorption line including an adsorption zone having an adsorbent mass adsorbing primarily a first constituent and secondarily a second constituent of said mixture, said method employing at least one elementary adsorption cycle employing said adsorption line, and further comprising an adsorption phase in which said mixture is introduced into the adsorption zone at an adsorption pressure, an elution phase in which a gaseous fraction enriched in said first constituent circulates in the adsorption zone at a pressure lower than said adsorption pressure while enriching said fraction in said second desorbed constituent, a desorption phase in which a gaseous fraction enriched in said first constituent is extracted from the inlet of said adsorption zone under a pressure lower than said elution pressure, and a pressure-rise or inflation phase in which the pressure in the adsorption zone is increased to the adsorption pressure. The invention also covers the installations for carrying the method and its alternatives into effect, and is especially applicable to the fractionation of atmospheric air into nitrogen, oxygen and water.

17 Claims, 5 Drawing Figures

METHOD OF AND INSTALLATION FOR THE FRACTIONATION OF A GASEOUS MIXTURE BY ADSORPTION

The present invention relates to a method and an installation for fractionating a gaseous mixture by adsorption. More particularly, the invention relates to a method of fractionation by adsorption of a gaseous mixture in which the desired product is obtained from the adsorbed phase. For example, the invention is applied to a separation of air by adsorption so as to obtain substantially pure nitrogen, in which this latter is adsorbed on the adsorbent mass employed.

In any process of fractionation by adsorption, there are obtained from a gaseous mixture treated:
  at least one gaseous fraction, generally obtained during or after an adsorption phase, impoverished in at least one constituent of the said mixture, and preferentially adsorbed on the adsorbent mass employed;
  at least one gaseous fraction enriched in at least the said constituent, generally obtained during a desorption phase of the adsorbent mass employed.

In general, the impoverished gaseous fraction constitutes the desired product, which is then evacuated from the adsorption installation for immediate use or storage. This impoverished gaseous fraction may also be evacuated to another fractionating stage of the installation for the purpose of further impoverishment.

The enriched gaseous fraction generally constitutes a by-product evacuated from the installation and recovered if it is of any value. For example, during purification of a gas by adsorption, the fraction impoverished in the adsorbed impurity or purified fraction constitutes the desired product, while the fraction enriched in desorbed impurity, or the impure fraction, constitutes a by-product which is evacuated and rejected from the adsorption installation.

There is known in particular a method of fractionation of a gaseous mixture (for example a mixture comprising from 95 to 99 percent of nitrogen and helium) which utilizes at least one adsorption line comprising an adsorption zone provided with an adsorbent mass which essentially adsorbs a first constituent (for example nitrogen) of the said mixture, the said method comprising at least one elementary adsorption cycle utilizing one said adsorption line, and comprising:
  an adsorption phase or pressure-rise phase, during which the gaseous mixture is introduced into at least the said adsorption zone, preferably through the inlet of this latter, while increasing the pressure existing in the said adsorption zone to an adsorption pressure.

At the end of this phase, the adsorbed phase at the adsorption pressure is essentially composed of the first constituent (for example nitrogen), while the nonadsorbed gaseous phase available in the adsorption zone at the adsorption pressure, occupying the empty spaces of this latter (between the grains of the adsorbent mass, etc.) is essentially composed of a second constituent of the gaseous mixture (for example helium) which is not adsorbed during the adsorption phase;
  a displacement phase of the above-adsorbed phase, during which a suitable fluid is circulated from the inlet to the outlet of the adsorption zone at a pressure substantially equal to the adsorption pressure. During this phase, the displacement fluid utilized plays the part of a fluid piston, acting under a pressure identical with the adsorption pressure, and pushing out the non-adsorbed phase through the outlet of the adsorption zone.

The circulation of this fluid is continued until the displacement fluid reaches the outlet of the adsorption zone but is not ejected from this latter, that is to say until the evacuated gaseous fraction, impoverished in the first constituent (for example helium) reaches a given content, incompatible with that desired; the desired object is in fact the maximum recovery of the non-adsorbed product (helium).

As the displacement fluid, there may be employed in certain cases, mercury, a non-wetting organic liquid; there is preferably employed a gaseous fraction substantially enriched in the first constituent (for example nitrogen), obtained for example during the following desorption phase;
  a desorption phase during which at least one gaseous fraction enriched in the first constituent (nitrogen for example) is extracted from the outlet of the adsorption zone, while reducing the pressure existing in the said zone to a desorption pressure lower than the adsorption pressure.

With a method of this kind, the fraction impoverished in the first constituent (for example impure helium) is evacuated from the installation, together with the fraction enriched in the first constituent (for example impure nitrogen) as a product and by-product respectively.

The adsorption cycle described above can readily be adapted to the recovery as a product, of the gaseous fraction enriched in the first constituent during the desorption phase, instead of the gaseous fraction impoverished in the first constituent during the displacement phase.

A cycle of this kind may for example be applied to the fractionation of air by adsorption in order to obtain nitrogen, this latter playing the part of the first constituent.

However, it is not generally possible to obtain in this way the first constituent in a substantially pure state, by reason of the following problem.

In the previous example of separation by adsorption of a mixture of helium and nitrogen, the second constituent (for example helium) is not, so to speak, adsorbed on the adsorbent mass concurrently with the first constituent, during the adsorption phase. This example constitutes a special case, and in practice in numerous cases of separation by adsorption, a second constituent of the gaseous mixture treated becomes co-adsorbed in a secondary manner on the adsorbent mass employed, during the adsorption phase. This is the case for example in a separation of oxygen from nitrogen by adsorption on a zeolite 5A. The immediate result is that it is impossible during the desorption phase to obtain the first constituent (for example nitrogen) in a substantially pure state.

The present invention has therefore for its object the definition of an adsorption cycle similar to that previously considered, in which a first constituent and a second constituent of a gaseous mixture treated are adsorbed on the adsorbent mass employed, in a principal manner and in a secondary manner respectively, which enables the first constituent to be obtained in a substantially pure state.

The invention relates to a method of fractionation of a gaseous mixture by adsorption, utilizing at least one adsorption line comprising an adsorption zone including an adsorbent mass which adsorbs in a principal manner at least one first constituent of the said mixture, and in a secondary manner at least one second constituent of the said mixture, the said method comprising at least one elementary adsorption cycle utilizing a said adsorption line, and comprising:

an adsorption phase during which the gaseous mixture is introduced into at least said adsorption zone, preferably through the inlet of said zone, and at the end of which the phase adsorbed in the said zone under an adsorption pressure is composed mainly of the first constituent and in a secondary manner, of the second constituent;

an elution phase during which a gaseous fraction enriched in at least the first constituent is circulated from the inlet to the outlet of at least the said adsorption zone, at an elution pressure in said zone lower than said adsorption pressure, while enriching the gaseous fraction evacuated from the said zone in at least the second constituent desorbed;

a desorption phase during which at least one fraction enriched in at least the first constituent is extracted from the inlet of the said adsorption zone, while at least the pressure existing in the said zone is reduced, to a desorption pressure lower than the elution pressure for the said zone;

a pressure-rise phase, during which at least the pressure existing in the said adsorption zone is increased, to the adsorption pressure for the said zone.

According to the invention, the adsorption phase and the pressure-rise phase may be combined in one.

The invention is therefore characterized by the elution phase referred to above. During this phase, part of the gaseous fraction enriched in the first constituent (which may be in a substantially pure state) obtained for example during the desorption phase and less rich in the second constituent than the adsorbed phase, passes in through the inlet and is evacuated from the outlet of the said adsorption zone.

This fraction thus assists in desorbing the second constituent co-adsorbed with the first constituent during the adsorption phase. The elution pressure, being lower than the adsorption pressure, also facilitates the desorption of the second constituent. During this phase, the elution fraction evacuated from the adsorption zone thus becomes gradually enriched in the second constituent, and at the end of the said phase, the adsorbed phase is essentially composed of the first constituent.

Correlatively, during the desorption phase, it thus becomes possible to obtain the first constituent in a substantially pure state, and to recover the maximum quantity of the product mainly adsorbed.

The present invention will now be described with reference to the accompanying drawings, in which.

Figure 4:
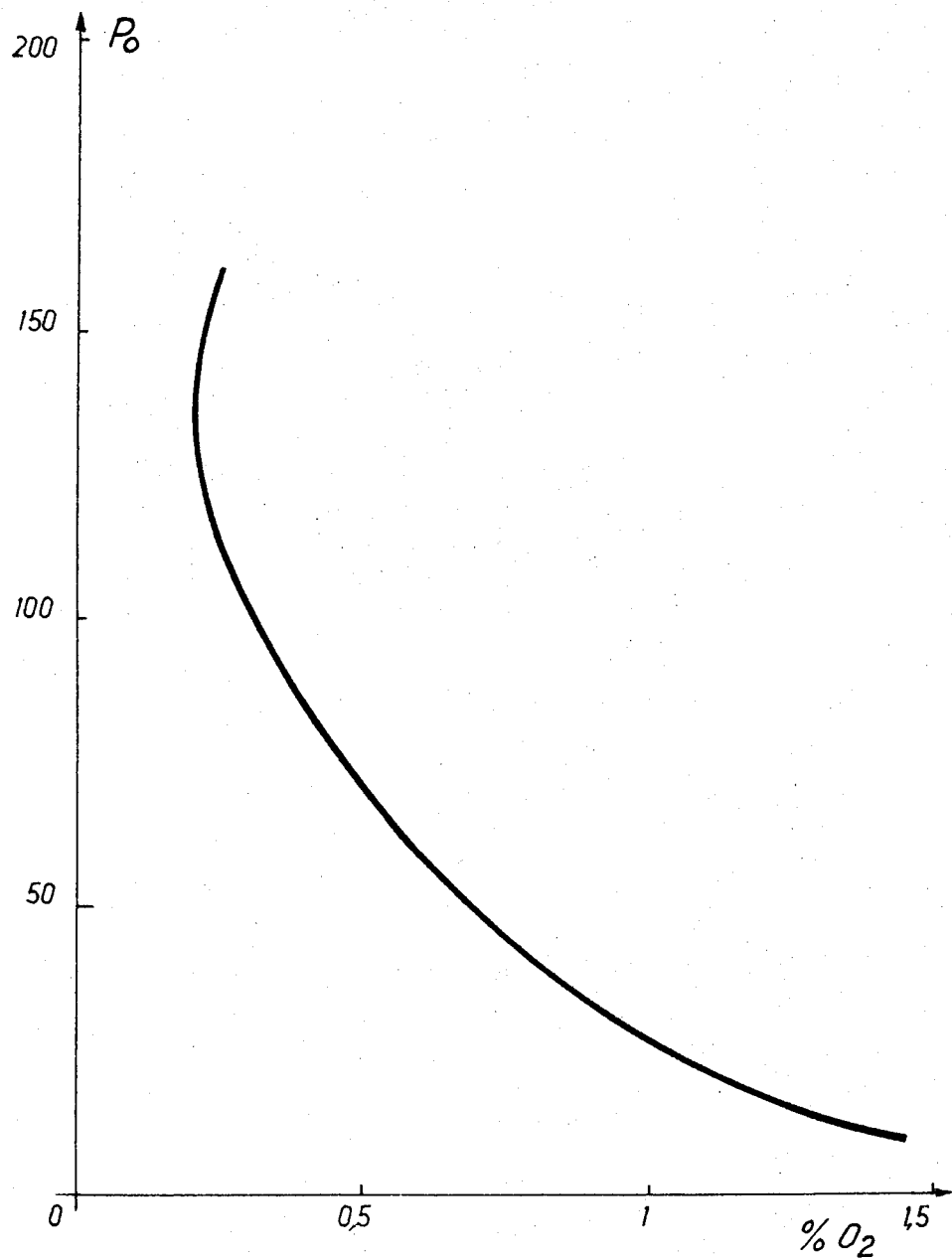

In the case of fractionation of air by adsorption, to obtain nitrogen according to the invention, FIG. 4 represents, with an elution volume of 8 litres, the variation of the content of oxygen of nitrogen produced (in abscissae) expressed as a percentage, as a function of the desorption pressure Po (in ordinates), expressed in mm. of mercury, reached at the end of the desorption phase;

FIG. 5 represents, again in the case of the fractionation of air by adsorption to obtain nitrogen, the variation of the efficiency of extraction of nitrogen (in ordinates) expressed as a percentage, as a function of the content of oxygen (in abscissae) expressed as a percentage of the nitrogen produced.

Figure 1:
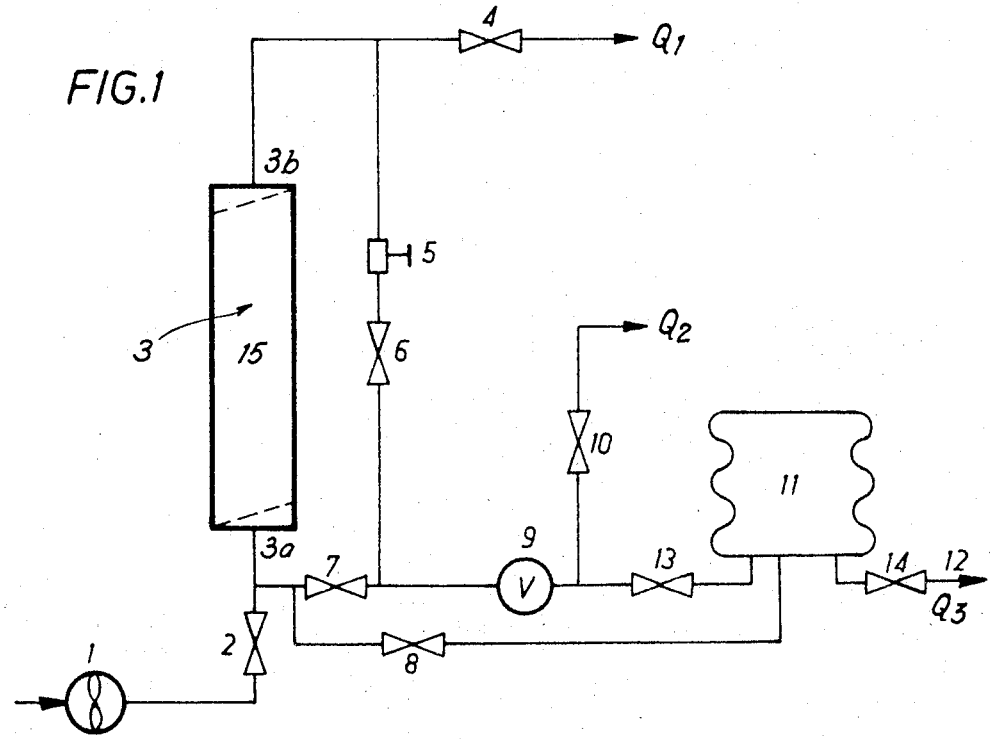
FIG. 1 shows an apparatus for carrying out the adsorption cycle in accordance with the invention.

The fractionating installation shown in FIG. 1 permits for example the fractionation by adsorption of air previously purified from water and carbon dioxide. This installation comprises an adsorption line comprising a main adsorber or adsorption zone provided with an adsorbent mass 15 (for example zeolite 5A) adsorbing in a main manner a first constituent (nitrogen) and in a secondary manner a second constituent (oxygen) of the gaseous mixture treated. The inlet 3a of the adsorber 3 is connected by the valve 2 to the downstream side of a first gaseous circulation means 1 (or air circulator) and with the upstream side of a second gaseous circulation means 9 (or vacuum pump). The outlet 3b of the adsorber 3 is connected to the upstream side of the vacuum pump 9 through the intermediary of the regulating cock 5 and the valve 6.

An elementary adsorption cycle utilized with the installation shown in FIG. 1, and comprising a single adsorption line includes:

A pressure-rise phase or inflation phase with a duration T/3 during which the outlet 3b of the adsorption zone 3 is closed and the inlet 3a of the said zone communicates exclusively with the air circulator 1 through the intermediary of the open valve 2. The gaseous mixture treated (air) is then introduced through the inlet 3a, while increasing the pressure existing in the said adsorption zone 3 from a desorption pressure (about 0.1 bar absolute) to an adsorption pressure (of 1 bar absolute) corresponding to the delivery pressure of the fan 1. At the end of this phase, corresponding to an adsorption phase represented by the path A–B of FIG. 2, the phase adsorbed on the adsorbent mass 15 is composed mainly of the first constituent (nitrogen) and in a secondary manner of the second constituent (oxygen);

an elution phase having a duration T/3, during which the inlet 3a of the adsorption zone 3 communicates exclusively with the tank 11 through the intermediary of the valve 8, and the outlet 3b of the said zone communicates with the upstream side of the vacuum pump 9 through the intermediary of the regulating cock 5 and the valve 6. The downstream side of the vacuum pump 9 then communicates with the atmosphere through the intermediary of the valve 10.

A gaseous fraction enriched in the first constituent (nitrogen) coming from the tank 11, is circulated from the inlet 3a to the outlet 3b of the adsorption zone 3, at an elution pressure slightly lower than the above adsorption pressure, that is to say slightly less than atmospheric pressure. This elution fraction becomes gradually enriched in the desorbed second constituent (oxygen), by sweeping over the adsorbent mass 15. The elution fraction enriched in oxygen, rejected through the outlet 3b, is evacuated from the installation through the valve 10. This elution phase corresponds to the path B–C of FIG. 2 and to the flow-rate $Q_2$ rejected by the valve 10.

As previously indicated, this elution phase ensures the elimination of the oxygen co-adsorbed with the nitrogen during the previous phase of pressure-rise or adsorption.

As desorption phase having a duration T/3, during which the outlet 3b of the adsorption zone 3 is closed, and the inlet 3a of the said zone communicates with the suction of the vacuum pump 9 through the intermediary of the valve 7. The delivery of this pump then communicates with the tank 11 through the valve 13, this latter communicating with a supply 12 through the valve 14.

During this phase, a fraction enriched in the first constituent (substantially pure nitrogen) is extracted through the inlet 3a of the adsorption zone 3, while reducing the pressure existing in this zone from the elution pressure to the final desorption pressure Po.

A part of the fraction enriched in nitrogen produced during this phase is stored in the tank 11 in order to ensure the elution of the previous phase, the other part is evacuated through the channel 12 and represents the flow Q3 of pure nitrogen available. This desorption phase corresponds to the part C–D of FIG. 2.

In the cycle of adsorption previously described and having a duration T, the adsorption phase corresponds to the pressure-rise phase or inflation. In certain cases, the adsorption phase may comprise an additional phase of constant-pressure extraction, comprised between the pressure-rise phase and the elution phase, carried out under the adsorption pressure of about 1 bar.

During this phase of constant-pressure extraction, the inlet 3a of the adsorption zone 3 communicates exclusively with the fan 1 and the outlet 3b of the said zone communicates exclusively with the valve 4. The gaseous mixture treated (air) is then circulated at the adsorption pressure from the inlet 3a to the outlet 3b of the adsorption zone 3. During this isobar phase, there is thus obtained through the outlet 3b, a fraction impoverished in the first constituent (impure oxygen), evacuated through the valve 4 and corresponding to the flow $Q_1$.

Figure 2:
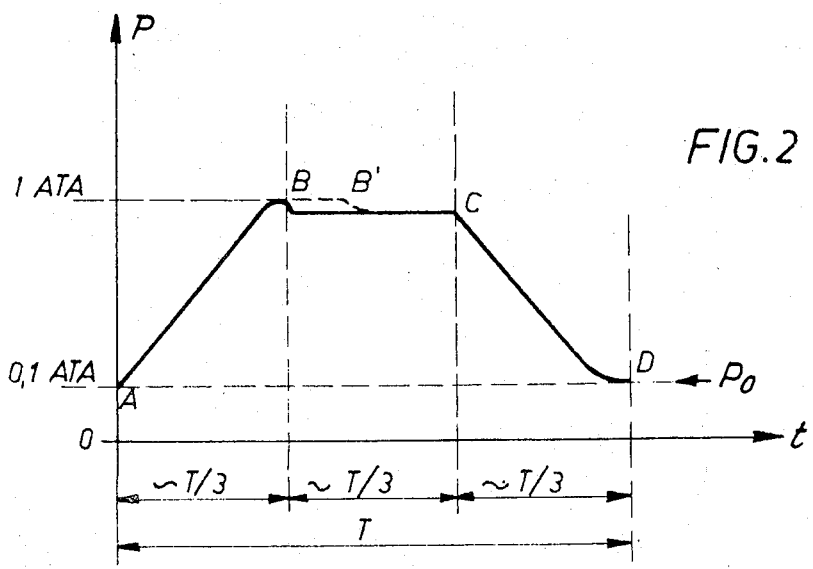
FIG. 2 is a diagram representing the evolution of the pressure in the adsorption zone of the apparatus shown in FIG. 1, as a function of time. The pressures are expressed in absolute atmospheres (ata)

This constant-pressure extraction phase corresponds to the path B–B' of FIG. 2. According to this latter figure, when this supplementary phase is carried out, the duration of the elution phase is reduced so that the total duration of the elution and constant-pressure extraction does not exceed the duration of the preceding elution phase, that is to say the time T/3.

With the installation shown in FIG. 1, utilizing an adsorption cycle such as that previously described in order to obtain nitrogen by adsorption from air, the adsorption zone 3 comprising 1.55 kg. of molecular sieve 5A, there was carried out a series of tests, the results of which are given in Tables I and II below. The figures indicated are relative to an adsorption cycle having a duration T of the order of 2 minutes.

TABLE I

| $Q_1$ (litres) (NTP) | Oxygen content of $Q_1$ (percent $O_2$) | $Q_2$ (litres) (NTP) | Oxygen content of $Q_2$ (percent $O_2$) | $Q_3$ (litres) (NTP) | Oxygen content of $Q_3$ (percent $O_2$) | Pressure at end of vacuum Po (mm. Hg) | Nitrogen extraction efficiency (percent) |
|---|---|---|---|---|---|---|---|
| 0 | | 8 | 31.5 | 4 | 0.17 | 50 | 42 |
| 0 | | 10 | 25.7 | 1.65 | .08 | 50 | 18 |
| 2.5 | 61 | 10 | 18.3 | 3.4 | .15 | 50 | 27.2 |
| 5 | 51.5 | 10 | 15.8 | 4.4 | .35 | 50 | 28.5 |
| 10 | 37.0 | 10 | 15 | 3.8 | .50 | 50 | 19.4 |
| 30 | 27.5 | 10 | 15 | 4.6 | .30 | 50 | 12.6 |
| 0 | | 8 | 30 | 2.5 | .80 | 100 | 28.5 |
| 2.5 | 51 | 8 | 22.8 | 4.5 | .90 | 100 | 30 |

NTP = Normal conditions of temperature and pressure.

TABLE II

| $Q_1$ Litres (NTP) | $Q_2$ Litres (NTP) | Pressure at end of vacuum Po mm.Hg | Oxygen content of nitrogen produced % $O_2$ | Nitrogen extraction efficiency % |
|---|---|---|---|---|
| 0 | 7 | 10 | 1.9 | 52.7 |
| 0 | 7 | 50 | 1.3 | 49.3 |
| 0 | 7 | 100 | 1 | 40.9 |
| 0 | 8 | 10 | 1.45 | 44.8 |
| 0 | 8 | 20 | 1.20 | 43.8 |
| 0 | 8 | 30 | 1.00 | 43.7 |
| 0 | 8 | 40 | 0.85 | 41 |
| 0 | 8 | 50 | 0.70 | 40 |
| 0 | 8 | 60 | 0.60 | 37.4 |
| 0 | 8 | 70 | 0.50 | 36.2 |
| 0 | 8 | 80 | 0.45 | 34.4 |
| 0 | 8 | 90 | 0.40 | 31.4 |
| 0 | 8 | 100 | 0.30 | 29.4 |
| 0 | 8 | 110 | 0.30 | 25.3 |
| 0 | 8 | 120 | 0.20 | 24.3 |
| 0 | 8 | 140 | 0.20 | 23.3 |
| 0 | 8 | 160 | 0.25 | 21.1 |
| 0 | 10 | 20 | 1 | 22 |
| 0 | 10 | 50 | 0.5 | 20.2 |
| 0 | 10 | 80 | 0.2 | 11.5 |
| 2.5 | 8 | 30 | 1.4 | 41 |
| 2.5 | 8 | 50 | 1 | 36.6 |
| 2.5 | 10 | 50 | 0.50 | 24.5 |
| 2.5 | 10 | 30 | 0.90 | 29.6 |

Figure 5:
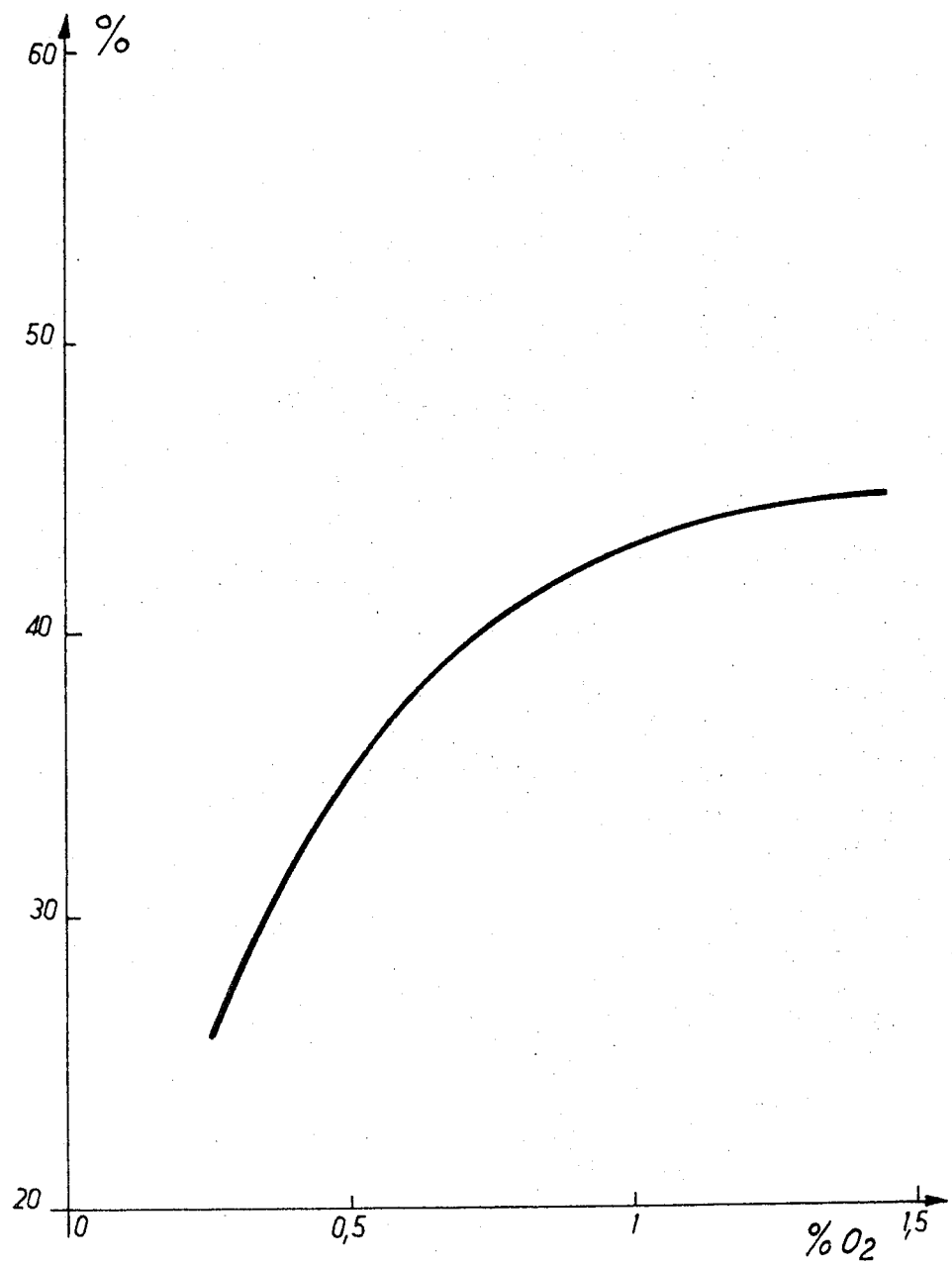

The curves of FIGS. 4 and 5 make it possible to note the influence of the various parameters acting during the adsorption cycle.

Figure 3:
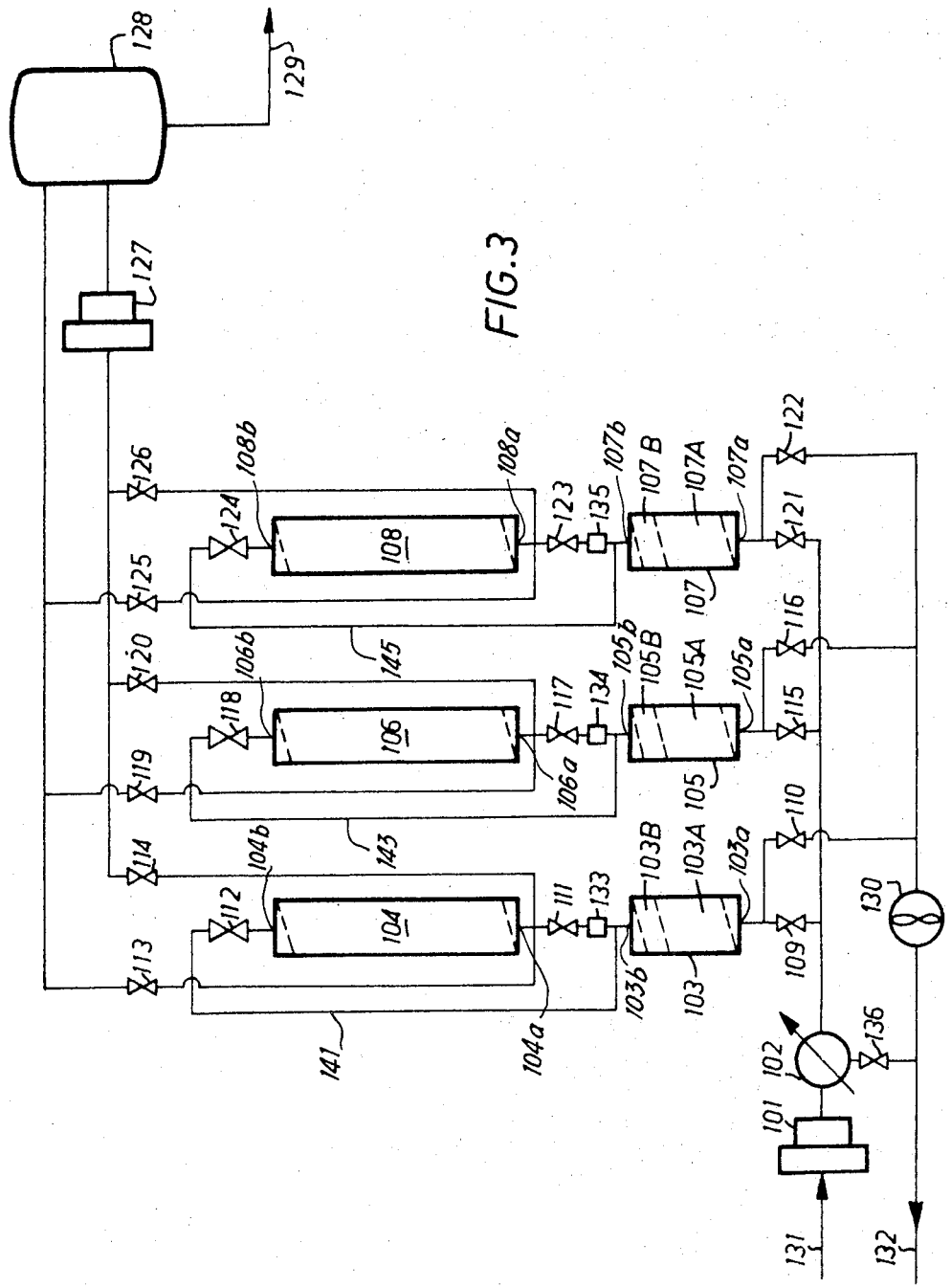
FIG. 3 shows an installation for fractionating atmospheric air by adsorption, comprising three adsorption lines, each working on an adsorption cycle in accordance with the invention.

The installation for fractionation by adsorption shown in FIG. 3 enables the adsorption cycle previously described to be utilized for the continuous production of substantially pure nitrogen from atmospheric air non-dried and non-decarbonated.

This installation comprises three adsorption lines similar to that previously described. Each adsorption line comprises an auxiliary adsorber or an auxiliary adsorption zone 103, 105, 107 having an auxiliary adsorbent mass 103A, 105A, 107A of activated alumina, preferentially adsorbing two other constituents (water and carbon dioxide) of the gaseous mixture treated (atmospheric air) and a main adsorber 104, 106, 108, identical with the adsorption zone considered in FIG. 1, comprising a main adsorbent mass (zeolite 5A), adsorbing in a principal manner a first constituent (nitrogen) and in a secondary manner a second constituent (oxygen) of the air treated.

The inlet 104a, 106a, 108a of each main adsorber is connected to the outlet 103b, 105b, 107b, of each auxiliary adsorber. The inlet 103a, 105a 107a, of each auxiliary adsorber is connected on the one hand to the downstream side of a first gaseous circulation means or compressor 101 through the intermediary of the valves 109, 115 and 121, and on the other hand to the upstream side of a second gaseous circulation means or fan 130 through the intermediary of the valves 110, 116 and 122.

The outlet 104b, 106b, 108b of each main adsorber is connected to the outlet 103b, 105b, 107b of each auxiliary adsorber by an external conduit 141, 143, 145, of the corresponding main adsorber. The inlet 104a, 106a, 108a, of each main adsorber is connected on the one hand with the upstream side of a third gaseous circulation means or vacuum pump 127 through the intermediary of the valves 114, 120 and 126 and on the other hand to a storage 128 through the intermediary of the valves 113, 119 and 125.

An expansion means 133, 134 and 135 is arranged between the outlet of each auxiliary adsorber and the inlet of each main adsorber. In addition, a heat-accumulation mass such as lead balls, 103B, 105B, 107B is arranged in each auxiliary adsorber between the auxiliary adsorbent mass 103A, 105A, 107A and the main adsorbent mass 104, 106, 108 of the corresponding adsorption line.

Atmospheric air is drawn-in at 131 by the compressor 101 which delivers the air at a pressure which can vary between 1 and 4 bars absolute. The cooling condenser 102 cools the compressed air to the ambient temperature, a part of the water thus obtained being evacuated by the automatic blow-out 136. The compressed air is then directed towards one of the three adsorption lines 103 – 104, 105– 106, 107 – 108. The three main adsorbers 104, 106, 108, identical with the adsorption zone 3 of FIG. 1, operate following the adsorption cycle previously described, this latter not having any isobar extraction phase (elimination of the path B – B' of FIG. 2).

The pressure-rise phase, (path AB), the elution phase (path BC), and the desorption phase (path CD) have a duration equal to T/3. In order to describe the method of fractionation by adsorption employed in the installation shown in FIG. 3, it is assumed that during the first period T/3, the first adsorption line 103–104 is in the pressure-rise phase, that the second adsorption line 105–106 is in the elution phase and that the third adsorption line 107–108 is in the desorption phase.

With respect to the elementary adsorption cycle previously described, there will be described below only the additional characteristics of the said cycle, necessary to adapt this latter to the presence of the auxiliary adsorption zone in the adsorption line.

During the pressure-rise or inflation phase of the first adsorption line, the inlet 103a of the auxiliary adsorption zone 103 communicates through the intermediary of the valve 109 exclusively with the outlet of the cooling condenser 102, and the outlet 104b of the main adsorption zone 104 is closed. The outlet 103b of the auxiliary zone and the inlet 104a of the main zone communicate with each other through the intermediary of the expansion valve 133 and the valve 111, The gaseous mixture treated (atmospheric air) is compressed and introduced into the auxiliary adsorption zone 103 and then into the main adsorption zone 104, after expansion in the valve 133. Simultaneously, the pressure existing in the auxiliary adsorption zone 103 is thus increased from the elution pressure (a pressure slightly lower than atmospheric pressure) to an auxiliary adsorption pressure equal to 4 bars absolute (delivery pressure of the compressor 101), and the pressure existing in the main adsorption zone 104 is increased from the desorption pressure Po (0.1 bar absolute) to the adsorption pressure of about 1 bar absolute.

Correspondingly, during this pressure-rise or inflation phase, there are adsorbed on the auxiliary adsorbent mass 103A of the auxiliary zone 103, two further constituents (water and carbon dioxide) of the air treated. At the end of the said phase, the auxiliary adsorption pressure is therefore higher than the adsorption pressure existing in the main zone 104.

During the same period, the second adsorption line 105–106 completes the elution phase previously considered. To this end, the outlet 106b of the main zone 106 communicates with the outlet 105b of the auxiliary zone 105 through the intermediary of the external conduit 143 and the valve 118. The inlet 105a of the auxiliary zone communicates with the suction of the fan 130 through the intermediary of the valve 116. As regards the inlet 106a of the main adsorption zone 106, this communicates through the intermediary of the valve 119 with a storage 128 of a fraction enriched in the first constituent (substantially pure nitrogen).

The gaseous elution fraction obtained at the outlet of the adsorption zone 106 circulates from the outlet 105b to the inlet 105a of the auxiliary adsorption zone 105 in counter-flow with the direction of adsorption during the phase previously described, at the elution pressure which is slightly lower than atmospheric pressure.

There is thus obtained at the outlet 105a of the auxiliary zone a gaseous fraction enriched in water and desorbed carbon dioxide; this latter is then evacuated from the installation through the conduit 132. The heat-accumulation mass 105B ensures the thermal reversibility of the adsorption of the water and carbon dioxide and of their desorption, carried out on the adsorbent bed 105A.

During this same period, the third adsorption line 107–108 carries out the desorption phase. To this end, the outlet 108b of the main zone 108 is closed and the inlet 108a of the said zone communicates exclusively with the suction of the vacuum pump 127 through the intermediary of the valve 126. During this phase, as previously described, there is extracted exclusively from the inlet 108a a fraction enriched in the first constituent (substantially pure nitrogen). A portion of this extraction is stored in the tank 128 in order to carry out the elution phase of an adsorption line. Another portion is evacuated as production by the line 129 at atmospheric pressure.

The valves 112, 118 and 124 have the same function during an elementary adsorption cycle.

During the next following period T/3, the first adsorption line 103–104 carries out the elution phase previously described, the second adsorption line 105–106 carries out the desorption phase previously mentioned and the third adsorption line completes the pressure-rise or inflation phase described above. During the last period T/3, the first line carries out the desorption phase, the second line, the pressure-rise or inflation phase, the third line the elution phase. The duration T may be of the order of 1.5 minutes.

In a similar manner to the adsorption cycle described with reference to FIG. 1, the adsorption phase may comprise a constant pressure extraction phase during which, for example for the first adsorption line, the gaseous mixture treated (atmospheric air for example) is circulated from the inlet 103a to the outlet 103b of the auxiliary adsorption zone at the auziliary adsorption pressure of 4 bars absolute; the gaseous mixture obtained at the outlet 103b is expanded in the expansion orifice 133 to the main adsorption pressure of 1 bar absolute, and the said gaseous pressure is then circulated from the inlet 104a to the outlet 104b of the main adsorption zone, at the main adsorption pressure.

There is thus obtained at the outlet 104b a fraction which is impoverished in the first constituent retained in the zone 104, and in a further constituent retained in the zone 103, this latter being air enriched in oxygen in the case of the treatment of atmospheric air.

What we claim is:

1. A method of fractionation of a gaseous mixture by adsorption, utilizing at least one adsorption line comprising an adsorption zone having an adsorbent mass which adsorbs primarily at least one first constituent of said mixture and secondarily at least one second constituent of said mixture, said method employing at least one elementary adsorption cycle utilizing said adsorption line, said method further comprising:

an adsorption phase during which said gaseous mixture is introduced into at least one said adsorption zone, preferably through the inlet of said zone, and at the end of which the phase adsorbed in said zone at an adsorption pressure is mainly composed of said first constituent and secondarily composed of said second constituent;

an elution phase during which a gaseous fraction enriched in at least said first constituent is circulated from the inlet to the outlet of said adsorption zone, at an elution pressure in said zone lower than the adsorption pressure, while enriching said gaseous fraction evacuated from said zone in at least said second constituent desorbed;

a desorption phase during which at least one fraction enriched in at least said first constituent is extracted from the inlet of said adsorption zone, while reducing at least the pressure existing in said zone to a desorption pressure lower than the elution pressure for said zone;

a pressure-rise phase during which at least the pressure existing in said adsorption zone is increased, to the adsorption pressure for said zone.

2. A method as claimed in claim 1, in which said adsorption phase comprises a constant-pressure extraction phase during which said gaseous mixture is circulated from the inlet to the outlet of at least said adsorption zone, at the adsorption pressure in said zone, obtaining at the outlet of said zone a fraction impoverished in at least said first constituent.

3. A method as claimed in claim 1, in which said pressure-rise phase includes an inflation phase, during which said gaseous mixture is introduced into at least said adsorption zone, while increasing at least the pressure existing in said zone, to the adsorption pressure for that zone.

4. A method as claimed in claim 3, in which, during said inflation phase, the pressure existing in said adsorption zone is increased from the desorption pressure to the adsorption pressure.

5. A method as claimed in claim 3, in which said adsorption phase comprises said inflation phase.

6. A method as claimed in claim 1, utilized for the fractionation of air freed from water and carbon dioxide, in which said first constituent is nitrogen and said second constituent is oxygen.

7. A method as claimed in claim 1, in which said adsorption line comprises an auxiliary adsorption zone which includes an auxiliary adsorbent mass preferably adsorbing at least one further constituent of said gaseous mixture, and wherein during the adsorption phase, said gaseous mixture is introduced in a direction of adsorption, first into said auxiliary adsorption zone and then into said main adsorption zone, while adsorbing on the auxiliary adsorbent mass at least one further constituent of said gaseous mixture, and at the end of said phase, the auxiliary adsorption pressure existing in said auxiliary adsorption zone is at least equal to said adsorption pressure;

during the elution phase, the gaseous fraction evacuated from the outlet of said adsorption zone is circulated from the outlet to the inlet of said auxiliary adsorption zone in counter-flow to the direction of adsorption, at the elution pressure, obtaining at the outlet of said zone a gaseous fraction enriched in at least said further constituent desorbed;

during the desorption phase, the fraction enriched in at least said first constituent is exclusively extracted from the inlet of said extraction zone.

8. A method as claimed in claim 7, in which, at the end of the adsorption phase, the auxiliary adsorption pressure is higher than the adsorption pressure.

9. A method as claimed in claim 8, in which said adsorption phase includes a constant-pressure extraction phase, during which said gaseous mixture is circulated from the inlet to the outlet of said auxiliary adsorption zone at the auxiliary adsorption pressure, and then from the inlet to the outlet of the adsorption zone at the adsorption pressure, obtaining at the outlet of the latter zone a fraction impoverished in at least said first constituent and said further constituent.

10. A method as claimed in claim 7, in which said pressure-rise phase includes an inflation phase during which said gaseous mixture is introduced into the auxiliary adsorption zone and then into the adsorption zone, while increasing the pressure existing in said auxiliary adsorption zone to the auxiliary adsorption pressure, and in said adsorption zone to the adsorption pressure.

11. A method as claimed in claim 10, in which, during said inflation phase, the pressure existing in said auxiliary adsorption zone is increased from the elution pressure, and the pressure existing in the adsorption zone is increased from the desorption pressure.

12. A method as claimed in claim 10, in which said inflation phase is included in the adsorption phase.

13. A method as claimed in claim 7, and applied to the fractionation of atmospheric air, in which said first, second and further constituents are respectively constituted by nitrogen, oxygen and water.

14. An installation for the fractionation of a gaseous mixture by adsorption, comprising at least one adsorption line including an auxiliary adsorber having an auxiliary adsorbent mass and a main adsorber having a main adsorbent mass, the inlet of said main adsorber being connected to the outlet of said auxiliary adsorber, in which the inlet of said auxiliary adsorber is connected at the same time to the downstream side of a first gas circulation means and to the upstream side of a second gas circulation means, the outlet of said main adsorber being connected to the outlet of said auxiliary adsorber by a conduit external to said main adsorber, while the outlet of said main adsorber is connected to the upstream side of a third gas-circulation means.

15. An installation as claimed in claim 14, and further comprising expansion means provided between the inlet of said main adsorber and the outlet of said auxiliary adsorber.

16. An installation as claimed in claim 14, and further comprising a thermal-accumulation mass disposed in the adsorption line between said auxiliary adsorbent mass and the main adsorbent mass.

17. An installation as claimed in claim 16, in which said thermal-accumulation mass is disposed in said auxiliary adsorber.

* * * * *